US012602062B2

(12) United States Patent
Thomasberg et al.

(10) Patent No.: US 12,602,062 B2
(45) Date of Patent: Apr. 14, 2026

(54) REDUCING RESISTANCE TO MOVEMENT OF DEVICES THAT INCLUDE CASTERS

(71) Applicant: MOBILE INDUSTRIAL ROBOTS A/S, Odense (DK)

(72) Inventors: Kristian Thomasberg, Ringe (DK); Troels Bo Jørgensen, Odense (DK); Jeppe Aakær Iversen, Odense (DK)

(73) Assignee: MOBILE INDUSTRIAL ROBOTS A/S, Odense (DK)

( * ) Notice: Subject to any disclaimer, the term of this patent is extended or adjusted under 35 U.S.C. 154(b) by 24 days.

(21) Appl. No.: 18/580,887

(22) PCT Filed: Jun. 28, 2022

(86) PCT No.: PCT/EP2022/067673
§ 371 (c)(1),
(2) Date: Jan. 19, 2024

(87) PCT Pub. No.: WO2023/001501
PCT Pub. Date: Jan. 26, 2023

(65) Prior Publication Data
US 2024/0338036 A1      Oct. 10, 2024

(30) Foreign Application Priority Data

Jul. 20, 2021      (EP) ..................................... 21186757

(51) Int. Cl.
*G05D 1/646*          (2024.01)
*B62D 7/14*           (2006.01)
*G05D 109/10*         (2024.01)
(52) U.S. Cl.
CPC .............. *G05D 1/646* (2024.01); *B62D 7/14* (2013.01); *G05D 2109/10* (2024.01)

(58) Field of Classification Search
CPC ....... G05D 1/646; G05D 2109/10; B62D 7/14
(Continued)

(56) References Cited

U.S. PATENT DOCUMENTS

2017/0315560 A1* 11/2017 Sun ...................... G05D 1/0265
2019/0294175 A1* 9/2019 Pajevic ................ G05B 19/416
(Continued)

FOREIGN PATENT DOCUMENTS

JP          2016212668 A      12/2016

OTHER PUBLICATIONS

Communication pursuant to Article 94(3) EPC in Application No. 21186757.7 dated Dec. 7, 2023, 14 pages.
(Continued)

*Primary Examiner* — Yazan A Soofi
(74) *Attorney, Agent, or Firm* — ArentFox Schiff LLP

(57) ABSTRACT

Planning driving sequences of mobile robots and other devices. In one aspect, a method includes receiving an instruction for movement of a device along a supporting surface. The device includes at least one drive wheel and at least one caster that is rotatable about a generally vertical axis. During motion, the caster is configured to reorient so that an swivel joint of the caster to the device leads a wheel of the caster. The method also includes planning a drive instruction for the device to implement the instruction for movement based on an orientation or expected orientation of the at least one caster upon beginning of the movement. The drive instruction is tailored to the drive wheel and the caster of the device and configured to limit reorientation of the caster during motion in accordance with the drive instruction.

20 Claims, 5 Drawing Sheets

(58) Field of Classification Search
USPC ........................................................ 701/23
See application file for complete search history.

(56) References Cited

U.S. PATENT DOCUMENTS

| | | | | |
|---|---|---|---|---|
| 2020/0030962 A1* | 1/2020 | Georgeson | ........... | B62D 57/024 |
| 2020/0339350 A1* | 10/2020 | Dooley | ................. | B65G 65/02 |
| 2021/0089034 A1 | 3/2021 | Hjelmaker | | |
| 2021/0096574 A1* | 4/2021 | Lee | ..................... | G05D 1/0225 |

OTHER PUBLICATIONS

Extended European Search Report in Application No. 21186757.7 dated Jan. 12, 2022, 9 pages.
International Preliminary Report on Patentability in Application No. PCT/EP2022/067673 dated Feb. 1, 2024, 10 pages.
International Search Report and Written Opinion in Application No. PCT/EP2022/067673 dated Oct. 7, 2022, 12 pages.
"MIR 500 User Guide," Mobile Industrial Robots A/S, Odense, SØ, Ver. 1.3, (Sep. 2019), 100 pages.
"MIR 100 User Guide," Mobile Industrial Robots A/S, Odense, SØ, Ver. 1.1, (Aug. 2018), 44 pages.
"MIR 100 User Guide," Mobile Industrial Robots A/S, Odense, SØ, Ver. 1.0, (Nov. 2017), 39 pages.
"MiRFleet Reference Guide," Mobile Industrial Robots A/S, Odense, SØ, Ver. 1.0, (Jan. 2017), 32 pages.
Communication pursuant to Article 94(3) EPC in Application No. 21186757.7, mailed on Jun. 10, 2024, 10 pages.

* cited by examiner

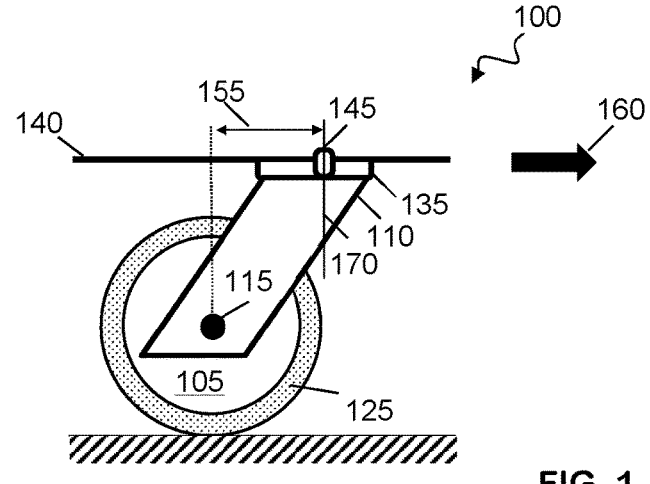
FIG. 1
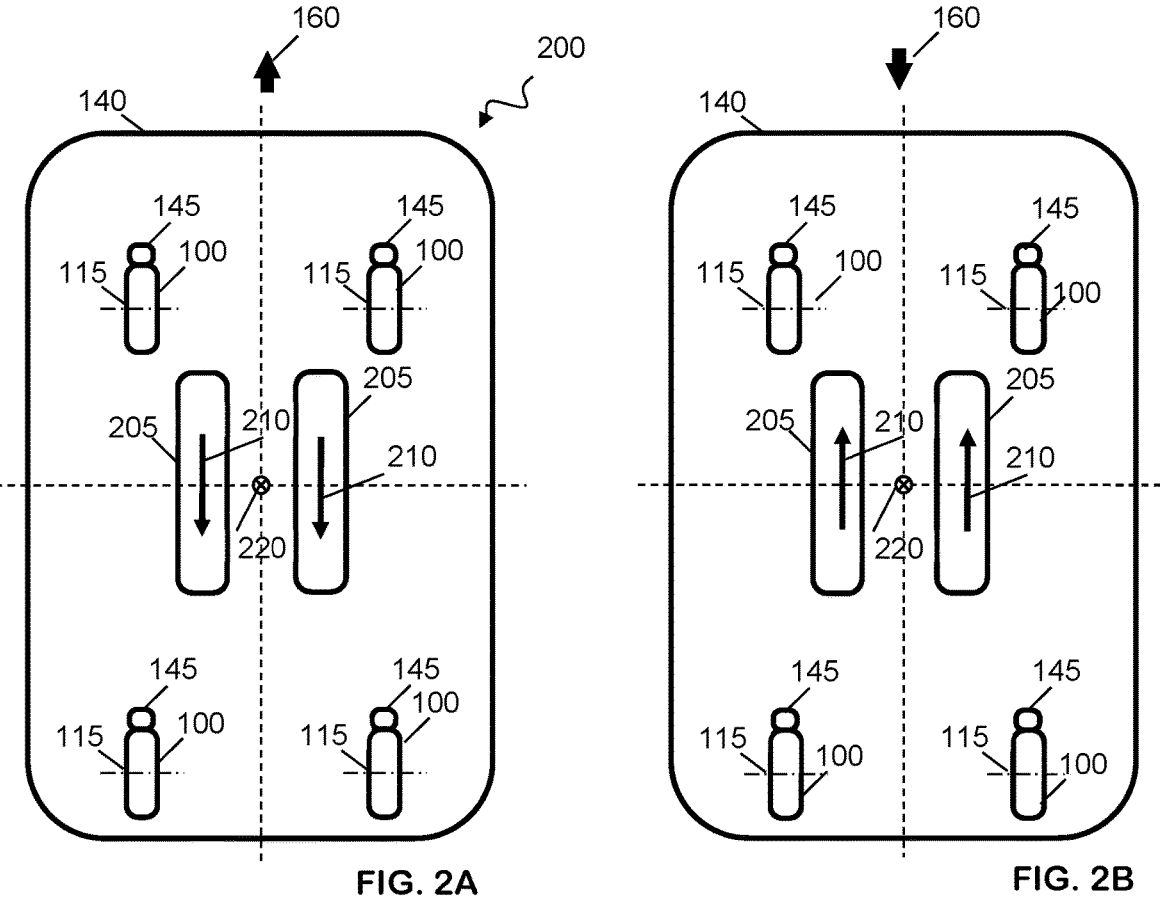
FIG. 2A                      FIG. 2B

FIG. 2C                    FIG. 2D

REDUCING RESISTANCE TO MOVEMENT OF DEVICES THAT INCLUDE CASTERS

CROSS-REFERENCE TO RELATED APPLICATIONS

This application is a national stage entry of PCT Application No. PCT/EP2022/067673, which was filed on Jun. 28, 2022. PCT Application No. PCT/EP2022/067673 claims priority to European Patent Application No. 21186757.7 which was filed on Jul. 20, 2021. This application claims priority to PCT Application No. PCT/EP2022/067673 and to European Patent Application No. 21186757.7. The contents of PCT/EP2022/067673 and of European Patent Application No. 21186757.7 are incorporated herein by reference.

TECHNICAL FIELD

This disclosure relates to planning driving sequences of mobile robots and other devices, and more particularly to driving sequences that reduce resistance to movement of devices that include casters.

BACKGROUND

Mobile robots are robots that are capable of moving in their surroundings. Mobile robots have become more commonplace in a variety of settings. For example, hospitals use autonomous mobile robots to move materials. Warehouses have installed mobile robotic systems to efficiently move materials from stocking shelves to order fulfillment zones. Mobile robots are also used in industrial, military and security settings.

Mobile robots can be autonomous in that they are capable of governing the performance of the programmed instructions independently. In other words, real-time control of operations by an external human or other operator is unnecessary for many actions. These autonomous operations can include defined actions that contribute directly to predefined operations (e.g., manufacturing products, transporting goods and materials, moving carts, cleaning, surveillance, disinfection, etc.) as well as actions that are responsive to unforeseen transient circumstances (e.g., identifying the position of movable obstacles and objects, including other of autonomous mobile robots, responding to alarms or safety conditions, and the like).

SUMMARY

The present disclosure relates to planning driving sequences of mobile robots and autonomous mobile robots that include casters, especially the planning of driving sequences that reduce resistance to movement.

In one aspect, a method includes receiving an instruction for movement of a device along a supporting surface. The device includes at least one drive wheel and at least one caster that is rotatable about a generally vertical axis. During motion, the caster is configured to reorient so that an swivel joint of the caster to the device leads a wheel of the caster. The method also includes planning a drive instruction for the device to implement the instruction for movement based on an orientation or expected orientation of the at least one caster upon beginning of the movement. The drive instruction is tailored to the drive wheel and the caster of the device and configured to limit reorientation of the caster during motion in accordance with the drive instruction.

This and other aspects can include one or more of the following features. Planning the drive instruction can include planning a plurality of different drive instructions for the device. Each of the different drive instructions can implement the same instruction for movement. The method can include selecting from amongst the plurality of different drive instructions based at least in part on an attempt to implement one or more of the different drive instructions. Planning the drive instruction can include applying a rule for conversion of the instruction for movement into a sequence of drive instructions. The method can include selecting the rule for conversion from amongst a plurality of rules for conversion of instructions for movement into a sequence of drive instructions. For example, the rule can be selected based on a load borne by the device or based on a sensitivity of an operational environment of the device to particulates. The instruction for movement can include an instruction for the device to move to and away from a location. A drive instruction that is planned to implement the instruction to move to and away from the location can include approaching the location at a first angle that is inclined in relation to a straight line trajectory for the device to move to the location, rotating the device through an angle along the straight line trajectory to a second angle that is inclined in an opposite direction in relation to the straight line trajectory, and moving away from the location at the second angle. The first angle can be inclined between 10 and 45 degrees in relation to the straight line trajectory. The second angle can be inclined between 10 and 45 degrees in the opposite direction in relation to the straight line trajectory. The device can be an autonomous mobile robot.

In another aspect, a mobile robot includes a chassis, a drive wheel mounted to the chassis, a motor coupled to drive the drive wheel, a caster mounted to the chassis at a swivel joint, wherein the caster is rotatable about a generally vertical axis so that, during motion, the caster reorients so that the swivel joint leads a wheel of the caster, a transducer configured to measure a resistance to movement of the mobile robot along a supporting surface, and a digital data processing system programmed to implement a drive planner. The drive planner can be configured to plan a plurality of drive instructions for the mobile robot to implement a single instruction for movement along a supporting surface. The digital data processing system can be configured to successively attempt different of the plurality of drive instructions until the resistance to movement of the mobile robot consistent with the attempted drive instruction is below a threshold.

This and other aspects can include one or more of the following features. The transducer can be an ammeter coupled to measure a current supplied to the motor. The digital data processing system can include a data store. The drive planner can be configured to check to determine if orientation information regarding an orientation or an expected orientation of the caster upon beginning of the movement is stored in the data store and, in response to determining that the orientation information is not stored in the data store, plan the plurality of drive instructions. The drive planner can be configured to, in response to determining that the orientation information is stored in the data store, plan a single drive instruction based on the stored orientation information. The drive planner can be configured to plan the plurality of drive instructions to comport with an excluded or permitted envelope of device drive instructions.

In another aspect, a method includes receiving an instruction for movement of a device along a supporting surface to move to and away from a location. The device includes at least one drive wheel and at least one caster that is rotatable about a generally vertical axis. During motion, the caster is configured to reorient so that an swivel joint of the caster to the device leads a wheel of the caster. The method also includes planning a drive instruction for the device to implement the instruction to move to and away from a location by approaching the location at a first angle that is inclined in relation to a straight line trajectory for the device to move to the location, rotating the device through an angle along the straight line trajectory to a second angle that is inclined in an opposite direction in relation to the straight line trajectory, and moving away from the location at the second angle.

This and other aspects can include one or more of the following features. Planning the drive instruction can include planning a plurality of different drive instructions for the device. Each of the different drive instructions can implement the same instruction for movement. The method can include selecting from amongst the plurality of different drive instructions based at least in part on an attempt to implement one or more of the different drive instructions. Planning the drive instruction can include applying a rule for conversion of the instruction for movement into a sequence of drive instructions. The method can include selecting the rule for conversion from amongst a plurality of rules for conversion of instructions for movement into a sequence of drive instructions. For example, the rule can be selected based on a load borne by the device. The first angle can be inclined between 10 and 45 degrees in relation to the straight line trajectory. The second angle can be inclined between 10 and 45 degrees in the opposite direction in relation to the straight line trajectory. The device can be an autonomous mobile robot. The method can also include planning a drive instruction for the device to implement the instruction for movement based on an orientation or expected orientation of the at least one caster upon beginning of the movement. The drive instruction can be tailored to the drive wheel and the caster of the device and configured to limit reorientation of the caster during motion in accordance with the drive instruction.

The details of one or more implementations are set forth in the accompanying drawings and the description below. Other features, objects, and advantages will be apparent from the description and drawings, and from the claims.

DESCRIPTION OF DRAWINGS

FIG. 1 is a schematic representation of a caster.

Like reference symbols in the various drawings indicate like elements.

DETAILED DESCRIPTION

Figure 2:
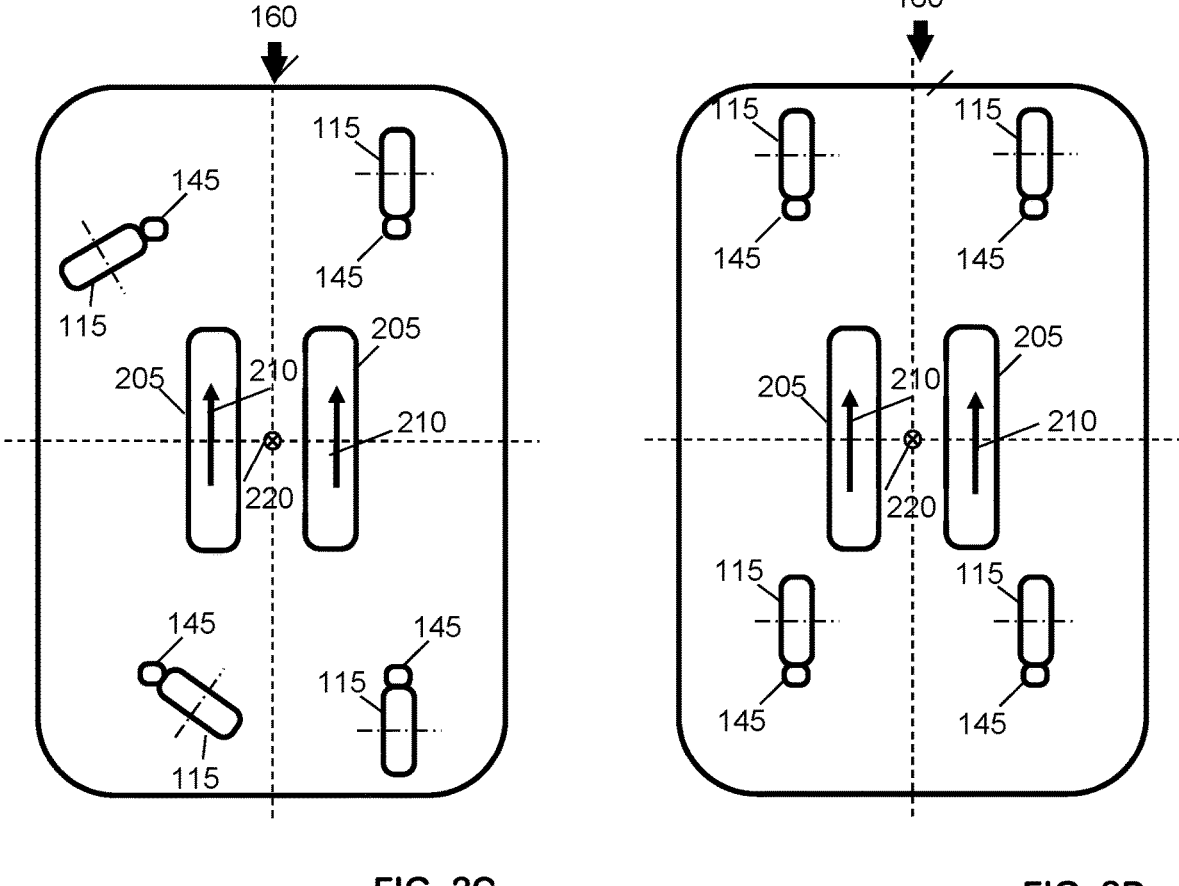
FIG. 2A is a schematic representation of a bottom-up view of an autonomous mobile robot.
FIGS. 2B, 2C, and 2D are a schematic representation of a bottom-up view of the autonomous mobile robot of FIG. 2A after the autonomous mobile robot has initiated travel.

FIG. 1 is a schematic representation of a caster 100. Casters, also called caster wheels or castors, are passive, undriven wheels that can be attached to the bottom part of the chassis of a mobile robot or other device. A caster is generally used to stabilize the device by providing an additional point of contact with the ground or other supporting surface. At times, the stability provided by a caster can impair maneuverability of the device, due to caster flutter or otherwise. The impairments can be particularly harmful in certain contexts. One example context is when heavy loads are carried and stability is threatened. Another example context is in clean room and other dust-sensitive environments where friction can generate harmful particulates.

The illustrated caster 100 includes a wheel 105, an axle 115, a fork 110, and a top plate 135.

Wheel 105 includes a central bore and has a radial dimension that is selected to accommodate the variability of the surfaces which are to be traversed. Wheel 105 includes a circumferential tread 125. Tread 125 arranged around the outer surface of wheel 105 and may be patterned or smooth. Tread 125 is generally made from a polymeric material. The composition of tread 125 may be tailored to the surface and application context of caster 100. For example, if caster 100 is to be used in a clean-room environment where minimization of particulates is of great importance, tread 125 can be made of hard polyurethane or nylon compounds.

Axle 115 and fork 110 together rotably mount wheel 105 to top plate 135. In the illustrated implementation, fork 110 includes a pair of generally planar blades that extend downward from a crown. One blade is in front of the wheel 105 and is visible. The other is behind wheel 15 and not visible in the illustration. The blades of fork 110 are separated from one another to accommodate wheel 105 therebetween and, as a unit, the blades and crown of fork 110 have sufficient mechanical strength to withstand the forces applied during use. Axle 115 extends between the blades through the central bore of wheel 105 and permits 360° radial rotation of wheel 105 about the central bore. In the illustrated orientation, axle 115 extends into and out of the plane of the page and rotation occurs clockwise and counterclockwise in the plane of the page.

Top plate 135 is a mechanical member that is configured to be coupled to a robot or other device. For example, top plate 135 can include holes for bolts or other fasteners for coupling to corresponding members on the device. In some implementations, proper alignment of top plate 135 relative to the device can be ensured using additional mechanisms such as, e.g., protrusions, lips, or other interlocking features that resist rotation of top plate 135 relative to the device.

Fork 110 is rotably mounted to top plate 135 at a swivel joint 145. Swivel joint 145 is a connection that allows wheel 105, axle 115, and fork 110 to rotate relative to top plate 135. In the illustrated orientation, such rotation would occur about an axis of rotation 170 that is in the plane of the page.

As shown, the central bore of wheel 105 is displaced laterally from axis of rotation 170. This displacement—which is horizontal in the illustrated implementation—is generally called the swivel offset 155. Since wheel 105, axle 115, and fork 110 can rotate relative to top plate 135, the orientation of axle 115 and swivel offset 155 relative to the plane of the page can also change.

In operation, caster 100 rotates about axis 170 to reorient relative to the direction of motion. For example, in the illustrated situation, caster 100 either has moved or is moving towards the right of the page, as indicated by arrow 160, long enough for caster 100 to have achieved a stable orientation. In this orientation, friction between caster 100 and the supporting surface causes caster to rotate about axis 170 so that swivel joint 145 leads wheel 105. In this orientation, there are relatively small frictional forces between wheel 105 and the supporting surface with further rightward motion. The device to which wheel 105 is mounted is relatively stable and little or no particulates are generated. However, deviations from rightward motion will increase frictional forces between wheel 105 and the supporting surface and resistance to movement of caster 100. Indeed, were caster 100 to instead move towards the left of the page (i.e., in the opposite direction of arrow 160), caster 100 would be subject to relatively large frictional forces as it rotates about axis 170 to reorient so that swivel joint 145 once again leads wheel 105. This reorientation is an example of caster flutter and can destabilize the device to which wheel 105 is mounted and/or generate relatively larger amounts of particulates.

FIG. 2A is a schematic representation of a bottom-up view of a robot that includes casters, namely, an autonomous mobile robot 200 (i.e., AMR 200). In addition to casters 100, AMR 200 includes one or more drive wheels 205 and a chassis 140. Chassis 140 is part of the load-bearing framework of AMR 200 and supports casters 100, drive wheels 205, and additional components of AMR 200—as well as any loads borne by AMR 200. In the illustrated implementation, chassis 140 is shown as a generally planar structure with a rectangular shape when viewed from below. However other shapes and structures are possible.

In the illustrated implementation, four different casters 100 are mounted to chassis 140 at positions that are generally adjacent respective corners of the rectangular-shaped chassis 140. In other implementations (e.g., if chassis 140 has a different shape or size), different numbers of casters 100 and different positioning can be used. Regardless of the particular configuration, respective top plate(s) 135 of the caster(s) 100 are mounted to chassis 140 and the caster(s) 100 stabilize AMR 200 by providing additional point(s) of contact with the ground or other supporting surface.

AMR 200 includes two drive wheels 205 that are rotably mounted on chassis 140 and radially dimensioned for frictional contact with the ground or other supporting surface. In the illustrated implementation, both drive wheels 205 are mounted towards the center of the rectangular-shaped chassis 140. In other implementations (e.g., if chassis 140 has a different shape or size), different numbers of drive wheels 205 and different positioning can be used. Regardless of the particular configuration, drive wheels 205 are independently further drivable bidirectionally (i.e., clockwise and counterclockwise) by respective motors (not shown) to provide forces that move and orient AMR 200.

In operation, because of the frictional contact between drive wheels 205 and the supporting surface, rotation of drive wheels 205 can imbue AMR 200 with rotational movement, translational movement, or both rotational and translational movement. In particular, should drive wheels 205 both rotate in the same direction at the same rate, AMR 200 will generally translate in a straight line (e.g., forwards or backwards). In contrast, should drive wheels 205 both rotate in opposite directions at the same rate, AMR 200 will generally rotate about a pivot point 220 clockwise or counterclockwise. Rotation of drive wheels 205 in the same direction but at different rates can be used to steer AMR 200 as it moves.

In FIG. 2A, stable forward motion of AMR 200 towards the top of the page (as indicated by arrow 160) is schematically illustrated. Drive wheels 205 have been rotating at the same speed and casters 100 are oriented consistent with that direction of motion. In particular, the portions of drive wheel direction of motion. In particular, the portions of drive wheel 205 in contact with the supporting surface are moving at the same speed in the direction of arrows 210, driving AMR in the direction of arrow 160. Casters 100 are oriented so that swivel joints 145 lead their respective wheel 105. The device to which casters 100 are mounted is relatively stable and little or no particulates are generated.

In contrast, in FIG. 2B, AMR 200 has initiated travel in the opposite direction as in FIG. 2A, i.e., towards the bottom of the page (as indicated by arrow 160). Drive wheels 205 have started to rotate at the same speed with the portions of drive wheel 205 in contact with the supporting surface moving in the direction of arrows 210. However, casters 100 have not yet reoriented to be consistent with that direction of motion, i.e., swivel joints 145 trail their respective wheel 105. Although this orientation may be stable for a short period, even minor perturbations can trigger reorientation of wheels 105. Further, the timing of the reorientation is subject to a large number of highly variable factors and generally not predictable.

FIG. 2C schematically illustrates an example of the unpredictable reorientation of wheels 105 during further travel towards the bottom of the page. One caster 100 (i.e., the caster in the upper right hand corner of chassis 140) has completed reorientation and its swivel joint 145 leads its wheel 105. Another caster 100 (i.e., the caster in the lower right hand corner of chassis 140) has not yet begun reorientation, i.e., its swivel joint 145 trails its wheel 105. The other two casters 100 on the left side of chassis 140 are at intermediate positions during reorientation.

Such intermediate positions can impair the maneuverability of the device to which casters 100 are mounted. Frictional forces between the casters and the supporting surface are larger than when the casters are rolling along the surface. Further, not only the timing, but also the orientation of the frictional and other resistance forces can be unpredictable. For example, in the illustrated reorientation, caster 100 in the upper left hand corner of chassis 140 is rotating clockwise about its axis 170, whereas caster 100 in the lower left hand corner of chassis 140 is rotating counterclockwise about its axis 170. The resistance to movement can thus destabilize a load and generate particulates.

FIG. 2D schematically illustrates stable reverse motion of AMR 200 towards the bottom of the page. Reorientation of casters 100 has been completed and their swivel joints 145 all lead their respective wheel 105. Once again, the device to which casters 100 are mounted is relatively stable and little or no particulates are generated.

A comparable reorientation of casters 100 will occur at other times during the operation of AMR 200. For example, were AMR 200 to make a sharp (e.g., 90 degree) turn, casters 100 would also have to reorient. As discussed above, such a turn can be achieved by rotating one drive wheel 205 in one direction and the drive wheel 205 in the opposite direction. For example, referring again the orientation of AMR 200 in FIG. 2A (i.e., after stable forward motion of AMR 200 towards the top of the page), a right hand turn in the plane of the page can be achieved by reversing the direction of rotation of the right-hand drive wheel 205 and continuing rotation of the left-hand drive wheel 205. AMR 200 would clockwise pivot about axis 220 and the casters 100 would orient so that their swivel joints 145 again lead the respective wheel 105. During the clockwise pivot of AMR 200 about axis 220, swivel joints 145 of the upper casters 100 would draw their respective wheels 105 to the right and downwards in the plane of the page. For the lower casters 100, swivel joints 145 would draw their respective wheels 105 to the left and upwards during the clockwise pivot. Reorientation of casters 100 would not be complete until rightward motion of AMR 200 starts and swivel joints 145 all lead their respective wheel 105. Although the resistance to movement during a sharp 90 degree turn may be less than those encountered when the direction of motion of AMR 200 is reversed, some amount of destabilization and particulate generation will still occur.

Figure 3:
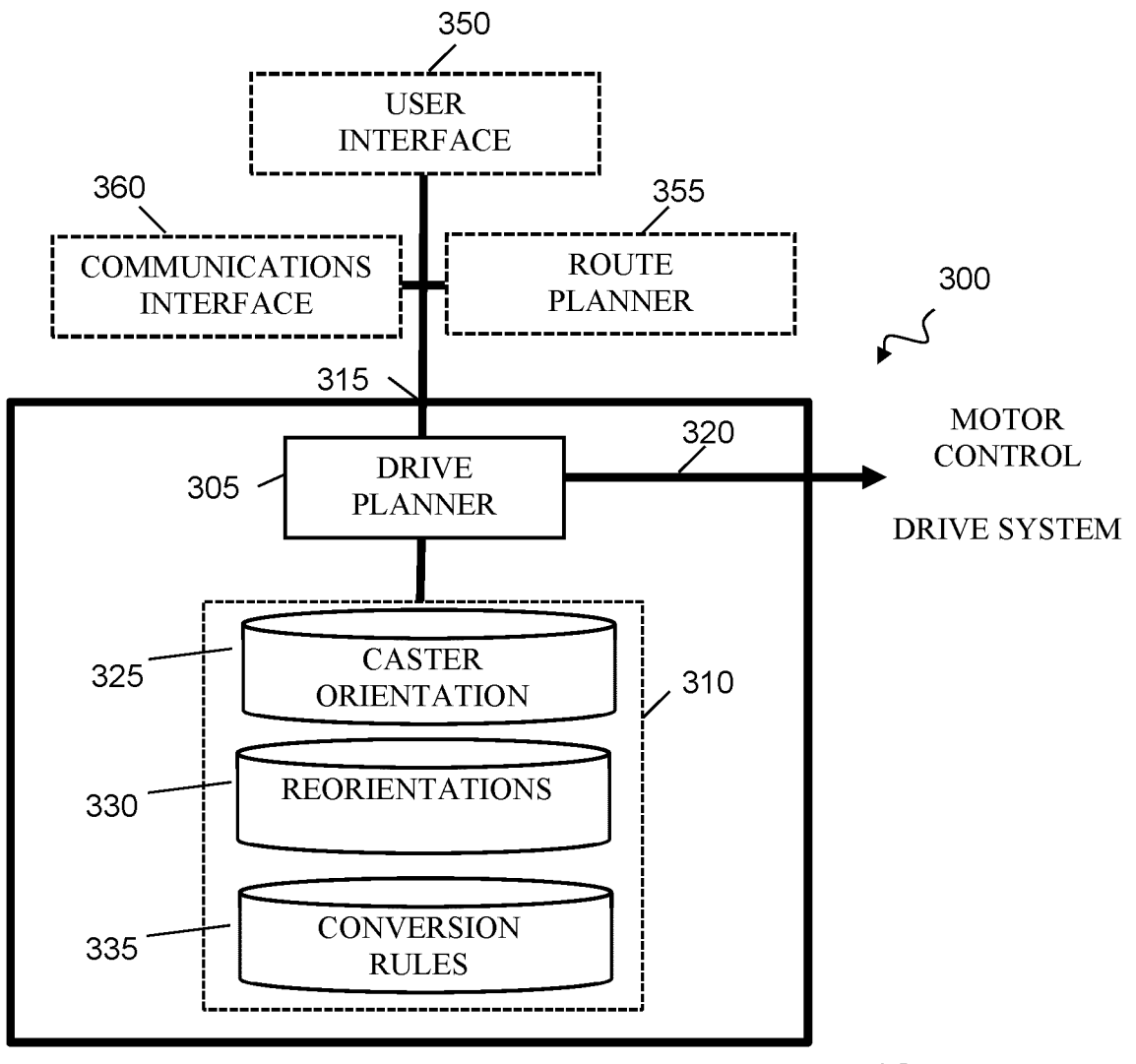
FIG. 3 is a schematic representation of a system for tailoring drive instructions.

The drive instructions for autonomous mobile robots or other devices can be tailored to avoid or reduce destabilization and/or particulate generation. FIG. 3 is a schematic representation of a system 300 for tailoring drive instructions. System 300 can either be part of a fleet management system that is responsible for tailoring drive instructions for a fleet of devices or part of an individual device (e.g., part of an individual AMR).

In the present context, drive instructions are to be distinguished from route planning. Route planning results in generally high level instructions, e.g., "travel from position A to position B along corridor X." In contrast, drive instructions are lower level instructions and tailored to the particular drive and caster system of the device that is implementing the planned route. For example, drive instructions may specify the particular direction and speed of drive wheels of the devices in order to implement the higher level route. At times, there may even be feedback from system 300 to a route planner, e.g., to indicate that a planned route cannot be implemented without excessive destabilization and particulate generation or to provide details regarding the exact positioning of the device while implementing a planned route. For example, system 300 may inform a human operator or a route planner that an autonomous mobile robot may have to move to the left side of a corridor before making a ride hand turn out of the corridor to avoid or reduce destabilization and/or particulate generation. The human operator or route planner that receives such feedback can use it in planning the routes of other devices, e.g., if the route planner is part of a fleet management system. Moreover, in some implementations, system 300 can be part of a route planning system and any limits/rules implemented by system 300 considered during high-level route planning.

The illustrated system 300 includes drive planner 305 and a data store 310. Drive planner 305 is implemented on a digital data processing device by implementing the logic of machine-readable instructions for tailoring drive instructions for a robot or other device. Drive planning controller 305 includes an input 315 and an output 320. Input 315 can be coupled to receive a high level description of a route to be traveled by a robot or other device. For example, the high-level description of the route can be received from a user interacting with a user interface 350. As another example, the high-level description of the route can be received from a computer-implemented route planner 355 that is part of the same device that includes system 300. For example, route planner 355 can be part of the same AMR or part of the same fleet management system that includes system 300. As another example, the high-level description of the route can be received over a communications interface 360. Communications interface 360 can itself receive the high-level description of the route from, e.g., a remote human operator or fleet management system.

Regardless of how the high-level description of the route is received, output 320 can be coupled to output a description of lower level drive instructions for implementing that route. The output drive instructions can be tailored to the particular drive and caster system of the device that is implementing the route. Drive planner 305 is coupled to data store 310 and accesses machine-readable data and/or instructions stored at data store 310 to tailor drive instructions.

Data store 310 can include data 325 that characterizes the actual or anticipated orientation of the caster(s) of a device at the beginning of the implementation of the received route, data 330 that characterizes limit or accepted reorientations of a device having a particular drive and caster system, data 335 that characterizes rules for converting higher level instructions into acceptable lower level drive instructions for a device having a particular drive and caster system, or two or more of data 325, 330, and data 335.

Data 325 characterizes the actual or anticipated angular orientation of one or more caster(s) about their respective axis 170 at the beginning of the implementation of the received route. In some implementations, data 325 can be derived from physical measurement of the angular positions, e.g., using a rotary encoder. The measured angular positions can be stored and used by drive planner 305 to ensure that the lower level drive instructions do not start with a movement that results in large resistance to movement. As yet another example, as discussed further below, data 325 can be inferred from successive attempts to drive a device in different directions while, e.g., measurements of the torque generated by a motor of the current supplied to the motor are made. For example, an ammeter can measure such a current.

In some implementations, data 325 can be derived from a historical record of movement by the device on which the casters are mounted. For example, with reference to FIG. 2A, if the historical record of movement of AMR 200 indicates that AMR has traveled in the direction of arrow 160 (i.e., upward in the plane of the page) for a distance that is sufficient for casters 100 to have reoriented, that information can be used to estimate the angular orientation of casters 100 and ensure that the lower level drive instructions do not start with a movement that results in large resistance to movement.

Data 330 can be expressed as an excluded envelope of device drive instructions (i.e., a set of drive instructions that are not permitted), as a permitted envelope (i.e., a set of drive instructions that are expressly permitted), or as a combination of an excluded and permitted envelope. In some implementations, different categories of reorientations can be established by data 330. For example, some reorientations may be permitted when a device is bearing lighter loads but excluded when a device is bearing heavier loads. As another example, some reorientations may be permitted when a device is in a particulate-insensitive environment but excluded when a device is in an environment that is sensitive to particulates, e.g., in a clean room. In different implementations, the envelopes can be expressed, e.g., in terms of a differential speed of the different driving wheels, in terms of angular differences between the casters and driving forces, in terms of resistance to movement of the device, in terms of torque applied to the casters, or in terms of combinations of these and other parameters. For example, in some implementations, an envelope may prohibit a device from traveling in a direction that deviates from the current orientation of any caster by 90 degrees or more, by 60 degrees or more, or by 45 degrees or more.

Data 335 can be expressed as a logical sequence for converting higher level instructions into acceptable lower level drive instructions. For example, a higher level instruction "reverse the direction of the device" can be converted into a lower level drive instructions that are tailored to the particular drive and caster system of the device that is implementing the reversal. In some implementations, data 335 can include a collection of different logical sequences for converting the same higher level instruction. For example, a first logical sequence may be suitable for converting a high level instruction when the device is bearing lighter loads and a second logical sequence may be suitable for converting the same high level instruction when the device is bearing heavier loads. As another example, a first logical sequence may be suitable for converting a high level instruction when the device is particulate-insensitive environment and a second logical sequence may be suitable for converting the same high level instruction when the device is in an environment that is sensitive to particulates, e.g., in a clean room.

In operation, system 300 can tailor drive instructions to avoid or reduce destabilization and/or particulate generation. Drive instructions can include smooth curves and avoid abrupt reorientations of casters.

For example, FIGS. 4 and 5A, 5B, 5C schematically represent an implementation of a drive sequence that implements a higher level instruction. The illustrated drive sequence can result, e.g., from conversion of a higher level instruction into lower level drive instructions. In the illustrated implementation, the higher level instruction instructs AMR 200 to move from a station A 405 to dock with a station B 410 and then return to dock with station A 405. This higher level instruction is schematically represented by arrows 415.

It is possible to implement instruction 415 by following a first straight line trajectory from station A 405 to station B 410 (left to right in the illustrated orientation) and a second straight line trajectory from station B 410 to station A 405 (right to left in the illustrated orientation). Indeed, these straight line trajectories would constitute the shortest-distance path for implementing instruction 415. However, such an implementation could destabilize the robot and/or generate particulates after AMR 200 reverses direction, as discussed and illustrated above in FIGS. 2A-2D.

Rather than implementing instruction 415 in this way, instruction 415 can be implemented in a manner that avoids or reduces destabilization and/or particulate generation. The implementation of instruction 415 can result in a path that is longer than the shortest-distance path or other possible paths-even if those paths are available (e.g., free from obstructions or traffic). Further, the implementation can follow, e.g., defined limits or accepted reorientations or a logical sequence for converting instruction 415 into acceptable lower level drive instructions.

In more detail, instruction 415 can be implemented by drive instructions that cause AMR 200 to deviate from straight trajectories and instead follow a first curved trajectory 420 from station A 405 to station B 410 implement a docking rotation in the vicinity of station B 410, and then follow a second curved trajectory 425 from station B 410 to station A 405. Assume that, before movement is begun, casters 100 of AMR 200 are oriented for stable movement from the right of the page to the left of the page whether along a straight line trajectory or along curved trajectory 420. During the times when trajectories 420, 425 are followed, casters 100 will continuously reorient so that their respective swivel joints 145 lead wheels 105. Casters 100 also reorient during a docking rotation in the vicinity of station B 410. However, the rate of change in the angle of casters 100 (i.e., the rate of rotation of casters 100 about axis 170) will be lower than in the event that AMR 200 were simply to reverse direction.

Figures 4, 5A, 5B, 5C:
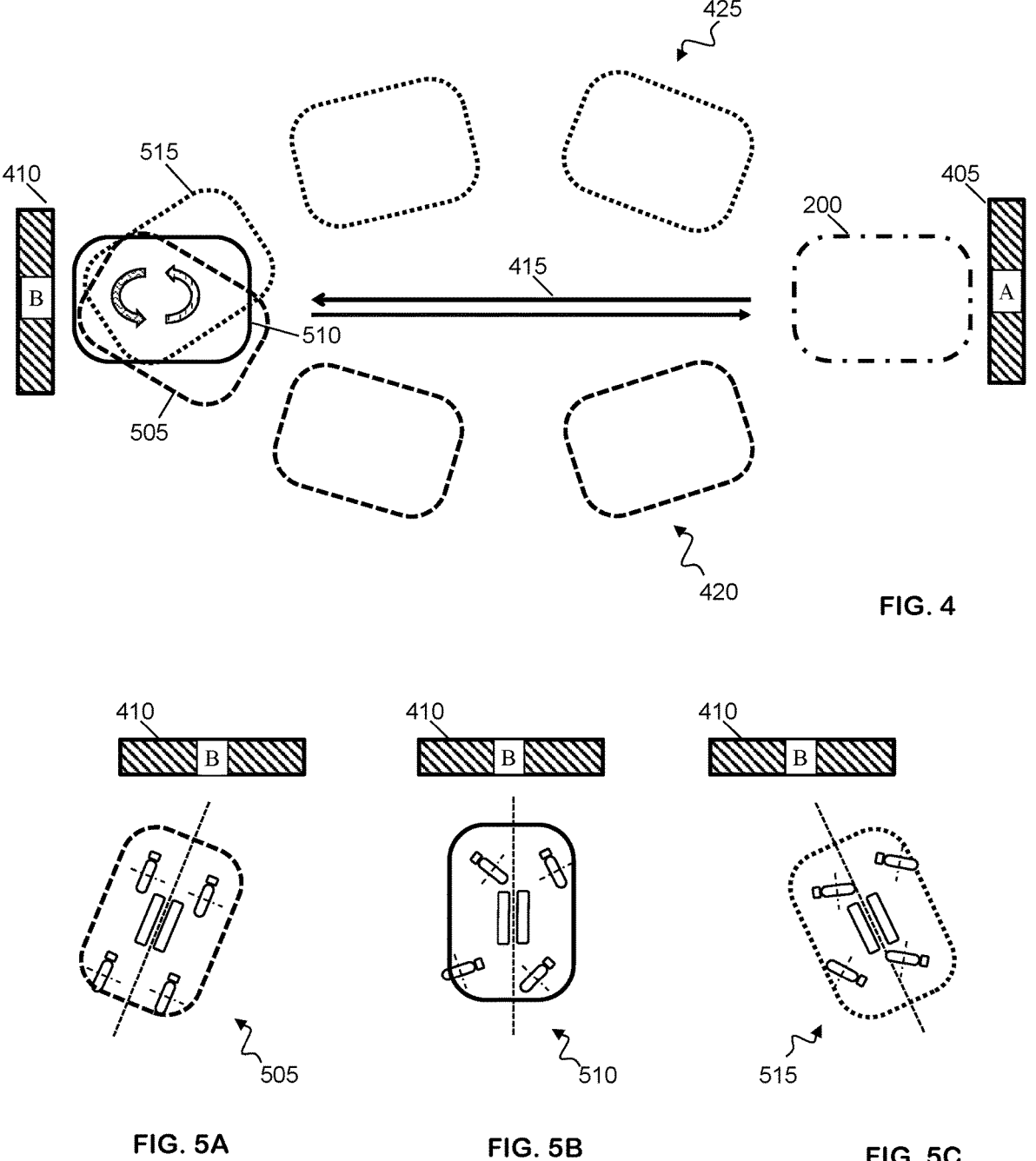
FIG. 4 and FIGS. 5A, 5B, 5C schematically represent an implementation of sequence of drive instructions that implements a higher level instruction.

FIGS. 5A-5C schematically illustrate the position of casters 100 at three different points in time 505, 510, 515 during the docking rotation. For the sake of convenience, those same points of time are represented in FIG. 4. In FIG. 5A, a time 505 is shown during which AMR 200 is arriving at station B 410. The angle of approach in inclined vis-à-vis the straight line trajectory from station A 405 to station B 410 and casters 100 are oriented such that swivel joints 145 lead their respective wheels 105. For example, the angle of approach can be inclined between 10 and 45 degrees in relation to the straight line trajectory. Casters 100 thus are already rotated vis-à-vis the orientation they would have had should AMR 200 have traveled along the straight line trajectory from station A 405 to station B 410.

At station B 410, AMR 200 performs a counter-clockwise rotation about axis 220 by driving drive wheels 205 in opposite directions. This counter-clockwise rotation of AMR 200 pulls swivel joints 145 in the same direction, with wheels 105 rotating in respective directions about each respective axis 170. In other words, in the illustrated implementation, swivel joints 145 that are above axis 220 in the plane of the page are drawn to the left. Swivel joints 145 that are below axis 220 in the plane of the page are drawn to the right. As a result, casters that are above axis 220 rotate in a counter-clockwise direction about their respective axis 170 whereas casters that are below axis 220 rotate in a clockwise direction about their respective axis 170. The result is schematically represented in FIG. 5B, which shows the position of casters 100 at time 510 while AMR 200 is docked at docking station B 410.

In FIG. 5C, a time 515 is shown during which AMR 200 is departing from station B 410. The angle of departure is again inclined vis-à-vis the straight line trajectory from station A 405 to station B 410—albeit with an opposite inclination of the angle of approach. For example, the angle of departure can be inclined between 10 and 45 degrees in relation to the straight line trajectory. At time 515, casters 100 have begun to reorient. However, swivel joints 145 do not yet lead their respective wheels 105 and some amount of destabilization and particulate generation will still occur. However, it will be less than the destabilization and particulate generation that would have occurred had AMR 200 followed straight line trajectories between station A 405 and station B 410.

Figure 6:
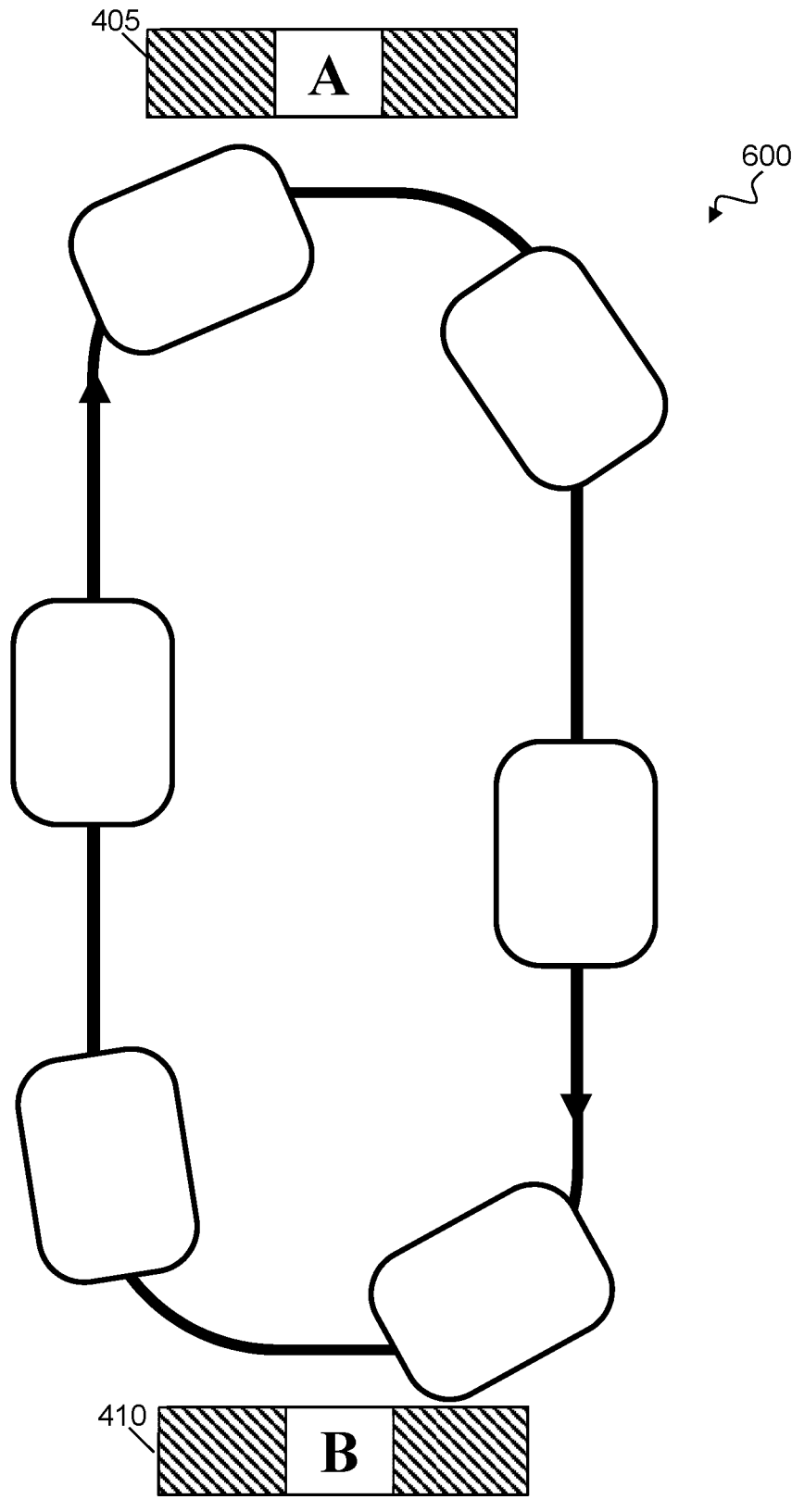
FIG. 6 schematically represents another implementation of a sequence of drive instructions that implements a higher level instruction.

FIG. 6 schematically represents another implementation of a drive sequence 600 that implements a higher level instruction. The illustrated drive sequence 600 can result, e.g., from conversion of a higher level instruction into lower level drive instructions. In the illustrated implementation, the higher level instruction again instructs AMR 200 to move from station A 405 to dock with station B 410 and then return to dock with station A 405. The higher level instruction can be instruction 415 shown in FIG. 4.

Once again, the higher level instruction can be implemented in drive instructions that avoid or reduce destabilization and/or particulate generation. The drive instructions can comport with an excluded or permitted envelope of device drive instructions. Either the permitted driving or the excluded driving can be defined in terms of angular differences between the casters and driving forces, in terms of resistance to movement of the device, in terms of torque applied to the casters, or as combinations of these and other parameters.

In more detail, drive sequence 600 does not include either reversals in direction or relatively sharp turns. Rather, the changes of direction are relatively small. Casters 100 can reorient so that swivel joints 145 always lead wheels 105 smoothly and with minimal frictional wear.

In some implementations, a drive planner can generate different collections of drive instructions for implementing a single higher level instruction. A human operator, a route planner, AMR 200 itself, or another device can select from amongst the different collections based on any of a number of different factors including, e.g., the application context, the amount of space available, the amount of traffic (including humans and other robots), and the time-sensitivity of tasks.

In some implementations, a drive planner can generate different collections of drive instructions without caster orientation data 325 and the selection from amongst the different collections can be based on successive attempts to drive AMR 200 in different directions. In more detail, information about the current orientation of casters 100 may often be absent. For example, a device may be newly brought on-line and starting operations or restarting after shut-down. As another example, a human or even another device may have moved AMR 200 in an unknown fashion since the last planned movement. As yet another, information about prior movements of the device may have become stale or been deleted.

Without information about the current orientation of casters 100 (e.g., without caster orientation data 325), drive planning may not be able to effectively reduce or avoid destabilization and particulate generation. For example, with reference to FIG. 4, the orientation of casters 100 when AMR 200 is positioned at station A 405 could factor in planning whether it is preferred that AMR 200 follow trajectory 420 to station B 410 or trajectory 425 to station B 410.

In some implementations, a device can be programmed to select from amongst different collections of drive instructions without information about the current orientation of casters 100 by attempting different movements. For example, an AMR 200 can initially try to move in a first direction by driving one or more drive wheels 205. The effort to move in that first direction can be limited, e.g., by limiting the maximum torque generated by a motor that drives a drive wheel 205 or by limiting the current that is supplied to such a motor. If the effort required to move in a first direction crosses a threshold (e.g., a torque or current threshold), then AMR 200 can end the attempt to move in the first direction and instead attempt to move in a second, different direction.

The different directions can be selected to scan a range of directions (e.g., every 10 degrees over a range of 90 degrees) or the different directions can be selected randomly. If none of the attempts initially succeeds, the threshold for ending an attempt can be raised and the attempts repeated with the new, higher threshold. Once an attempt succeeds, a collection of drive instructions that is consistent with the direction of movement can be selected for completing the higher level instruction.

A number of implementations have been described. Nevertheless, it will be understood that various modifications may be made. Accordingly, other implementations are within the scope of the following claims.

The invention claimed is:

1. A method comprising:
   receiving an instruction for movement of a device along a supporting surface, the device comprising at least one drive wheel and at least one caster, the at least one caster comprising an undriven wheel, the at least one caster being rotatable about a generally vertical axis associated with a swivel joint, where, during motion, the at least one caster is configured to reorient so that the swivel joint leads the undriven wheel; and
   planning drive instructions for the device to implement the instruction for movement of the device based on an orientation or an expected orientation of the at least one caster upon beginning of the movement, wherein the drive instructions are tailored to the at least one drive wheel and the at least one caster, and wherein the drive instructions are configured to instruct the device to move in a first direction and, when a predefined threshold is crossed, to instruct the device to move in a second direction that is different from the first direction.

2. The method of claim 1, wherein planning the drive instructions comprises planning a plurality of different drive instructions for the device, wherein the drive instructions together implement the instruction for movement.

3. The method of claim 2, further comprising selecting a drive instruction from among the drive instructions based at least in part on the predefined threshold having been crossed.

4. The method of claim 1, wherein planning the drive instructions comprises applying a rule for conversion of the instruction for movement into a sequence comprising the drive instructions.

5. The method of claim 4, further comprising selecting the rule for conversion from among a plurality of rules for conversion of instructions for movement into the drive instructions.

6. The method of claim 5, wherein selecting the rule comprises selecting the rule based on a load borne by the device or based on a sensitivity of an operational environment of the device to particulates.

7. The method of claim 1, wherein the instruction for movement comprises an instruction for the device to move to and away from a location.

8. The method of claim 7, wherein the drive instructions comprises operations to cause the device to:
   approach the location at a first angle that is inclined in relation to a straight line trajectory toward the location;
   rotate the device through an angle along the straight line trajectory to a second angle that is inclined in an opposite direction in relation to the straight line trajectory; and
   move away from the location at the second angle.

9. The method of claim 8, wherein:
   the first angle is inclined between 10 and 45 degrees in relation to the straight line trajectory; and
   the second angle is inclined between 10 and 45 degrees in the opposite direction in relation to the straight line trajectory.

10. The method of claim 1, wherein the device comprises an autonomous mobile robot.

11. A mobile robot comprising:
   a chassis;
   a drive wheel mounted to the chassis;
   a motor coupled to drive the drive wheel;
   a caster mounted to the chassis at a swivel joint, the caster comprising an undriven wheel, wherein the caster is configured to rotate about a generally vertical axis so that, during motion, the caster reorients so that the swivel joint leads the undriven wheel;
   a transducer configured to measure a resistance to movement of the mobile robot along a supporting surface; and
   a digital data processing system programmed to implement a drive planner, wherein the drive planner is configured to plan a plurality of drive instructions for the mobile robot to move along the supporting surface, wherein the digital data processing system is configured to instruct the device based on the plurality of drive instructions to move in a first direction and, when a predefined threshold is crossed, to instruct the device to move in a second direction that is different from the first direction, the predefined threshold being based on the resistance to movement of the mobile robot.

12. The mobile robot of claim 11, wherein the transducer comprises an ammeter coupled to measure a current supplied to the motor.

13. The mobile robot of claim 11, wherein the digital data processing system comprises a data store and the drive planner is configured to check to determine if orientation information regarding an orientation or an expected orientation of the caster upon beginning of the movement is stored in the data store and, in response to determining that the orientation information is not stored in the data store, to plan the plurality of drive instructions.

14. The mobile robot of claim 13, wherein the drive planner is configured to, in response to determining that the orientation information is stored in the data store, plan a high-level drive instruction based on the stored orientation information, the high-level instruction comprising a collection of two or more drive instructions.

15. The mobile robot of claim 11, wherein the drive planner is configured to plan the plurality of drive instructions to comport with an excluded or permitted envelope of device drive instructions.

16. Non-transitory machine-readable storage storing instructions that are executable by a processing device to perform operations comprising:

receiving an instruction for movement of a device along a supporting surface, the device comprising at least one drive wheel and at least one caster, the at least one caster comprising an undriven wheel, the at least one caster being rotatable about a generally vertical axis associated with a swivel joint, where, during motion, the at least one caster is configured to reorient so that the swivel joint leads the undriven wheel; and planning drive instructions for the device to implement the instruction for movement of the device based on an orientation or an expected orientation of the at least one caster upon beginning of the movement, wherein the drive instructions are tailored to the at least one drive wheel and the at least one caster, and wherein the drive instructions are configured to instruct the device to move in a first direction and, when a predefined threshold is crossed, to instruct the device to move in a second direction that is different from the first direction.

17. The non-transitory machine-readable storage of claim 16, wherein planning the drive instructions comprises planning a plurality of different drive instructions for the device, wherein the drive instructions together implement the instruction for movement.

18. The non-transitory machine-readable storage of claim 17, wherein the instructions that are executable comprise selecting a drive instruction from among the plurality of different drive instructions to instruct the device to move in the second direction.

19. The non-transitory machine-readable storage of claim 16, wherein planning the drive instruction comprises applying a rule for conversion of the instruction for movement into a sequence comprising the drive instructions.

20. The non-transitory machine-readable storage of claim 19, wherein the instructions that are executable comprise selecting the rule for conversion from among a plurality of rules for conversion of instructions for movement into the drive instructions.

\* \* \* \* \*